Nov. 24, 1959     C. J. VANDER ZEE     2,913,754

WIPING DEVICE FOR OUTSIDE REAR-VIEW MIRRORS

Filed July 24, 1953

INVENTOR.
Christian J. Vander Zee
BY
Emerson B Donnell
ATTORNEY

United States Patent Office 2,913,754
Patented Nov. 24, 1959

2,913,754

WIPING DEVICE FOR OUTSIDE REAR-VIEW MIRRORS

Christian J. Vander Zee, Racine, Wis.

Application July 24, 1953, Serial No. 370,191

2 Claims. (Cl. 15—253)

The present invention relates to rear view mirrors and an object of the invention is to generally improve the construction and operation of devices of this class.

Rear view mirrors are generally of two types, those which are located within the vehicle or enclosure, and those which are outside, the latter being commonly used, and in fact essential on large vehicles such as busses and trucks, and it is to this last type of mirror that the invention relates particularly, although it is not to be taken as limited to such use, or in fact in any manner except as herein set forth. Such mirrors, being located outside of the vehicle are exposed to the elements, and often become obscured by rain, flying mud, snow and the like, and it is a great inconvenience if not an impossibility to keep the mirror clean enough to be of use in stormy weather, and under these conditions a great safety expedient has to be sacrificed.

A further object of the invention, therefore, is to provide convenient, practical and inexpensive expedients for keeping an outside mirror clean regardless of rain, flying mud, snow or the like.

A further object is to provide wiping means for rear-view mirrors, and further objects are to provide;

Such means which can be easily accommodated in a housing of reasonable size; such a means which will clear a mirror of a size and shape convenient for the purpose intended; such a means which will clear substantially the whole surface of such a mirror; which can be assembled at least in part from units which are found on the market; and which is made up of a reasonable number of easily fabricated parts and which will not be excessively costly to replace if accidentally damaged.

Further objects will become apparent as the specification proceeds.

Figure 1:
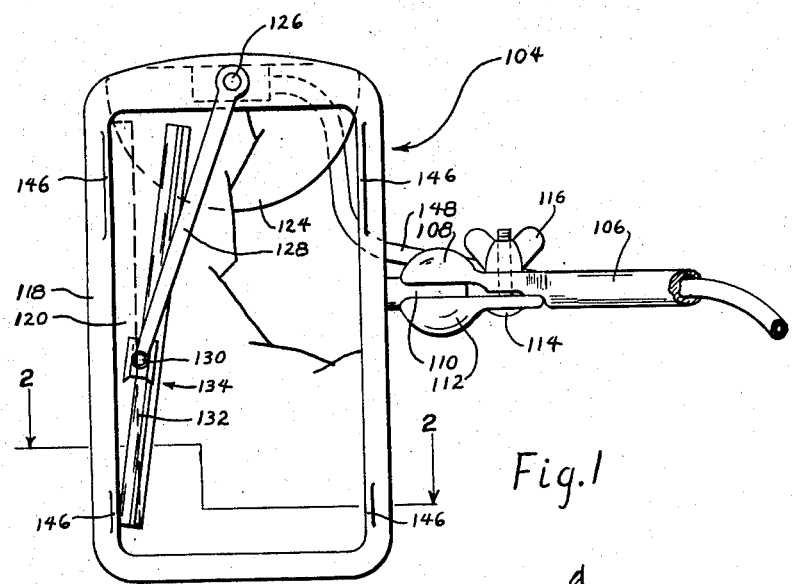
Figure 2:
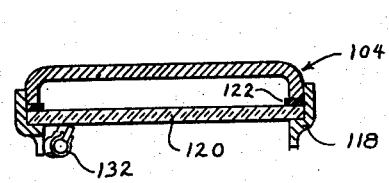
Figure 3:
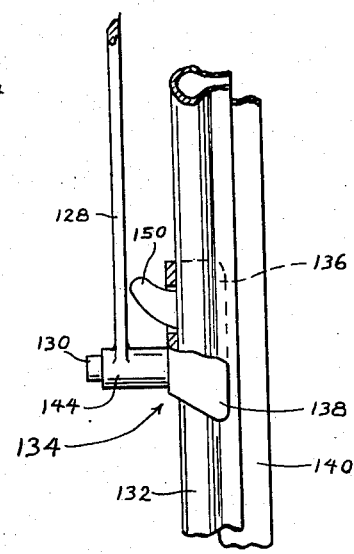

In the drawings, Figure 1 is a rear elevation of an illustrative embodiment of the device with parts broken away to show what lies behind; Fig. 2 is a horizontal cross section on the line 2—2 of Fig. 1; Fig. 3 is an enlarged right side elevation of certain mechanism indicated in Fig. 1.

Fig. 1 shows a form of the invention in which a housing portion 104 is supported on a bracket 106, the latter including a part-spherical socket portion 108 engaging a ball portion 110 fixed in relation to housing 104, a part-spherical clamping portion 112 opposing portion 108 and serving to clamp ball portion 110 in adjusted position relatively to bracket 106, a clamping bolt 114 extending through clamping portion 112 and adjacent to portion 108 and having a thumb-nut 116 for tightening. Housing 104, as more particularly shown in Fig. 2 has a frame or bezel 118 fastened thereto in any suitable manner and clamping between itself and housing 104 a glass or other reflecting surface 120, a cushion or gasket 122 being preferably interposed between surface 120 and housing 104. Housing 104 may be of any suitable or desirable shape and encloses therein a motor 124 preferably of well-known type and shown as vacuum operated, although an electrically operated motor may be used within the contemplation of the invention, as may one operated by fluid pressure instead of vacuum. Essentially the motor is one of a number of types which produce a cyclic oscillation of an output shaft 126, and to which is attached a wiper arm 128 which is flexible or flexibly mounted and biased inwardly toward surface 120. Arm 128 has, in the present instance, pivotally secured thereto by a pin, trunnion or the like 130, and which embraces in suitable or well-known manner a wiper blade 132, a clip keeper 134, carried by trunnion 130 and having spaced side wings 136 and 138 which are spread sufficiently to permit shifting of blade 132 at each reversal of motion. Blade 132 has a hook 150 loosely engaged in a suitable aperture in clip 134 to maintain blade 132 in place, and arm 128 is provided with a sleeve 144 for pivotal engagement with trunnion 130. In this respect, it is to be noted that blade 132 is mounted in off-center relation at the pivot pin 130, with the longer portion of the blade disposed above the pivot mounting. Consequently, the upper portion of the blade will trail the lower portion as the blade is moved across the mirror by action of the wiper arm. It will thus be seen that, unlike well-known wiper devices, blade 132 is not constrained to remain in line with arm 128, but is free to swivel relatively thereto by virtue of trunnion 130.

The area of surface 120 is limited, of necessity since an outside mirror would be cumbersome if too large, while a blade retained in line with arm 128 would be seriously limited in the portion of surface 120 which it could cover. Because of the swivel connection 130, blade 132 after completion of part of a stroke will encounter one or another of stop portions 146, which will arrest the end of the blade 132 at the edge of surface 120, continued motion of the arm 128 causing swinging of blade 132 toward alignment with one side of surface 120 or frame 118. By suitably controlling the motion of arm 128, blade 132 may be made to take up the dotted position in Fig. 1, and a corresponding position at the opposite side of surface 120. It is probable that, owing to pivotal connection 130, blade 132 will move across surface 120 in a somewhat uncontrolled manner, but, since the area of surface 120 is limited, it is impossible for blade 132 to get far enough out of line but that it will be straightened out when it gets to the end of its travel, so that surface 120 will be satisfactorily wiped with the least possible mechanism.

A tube or conduit 148 extends through bracket 106, emerging and passing into housing 104 beyond socket portion 108 and connects with motor 124 to transmit suction or fluid pressure thereto, and in the event of an electric motor an electric conduit could be substituted within the contemplation of the invention.

The position of the device may be readily adjusted by loosening thumb-nut 116 and shifting housing 104 until the best adjustment for viewing is obtained after which nut 116 may be tightened to maintain the adjustment.

In case it is preferred to have blade 132 remain in line with arm 128, it is contemplated to make surface 120 substantially in the shape of the pattern described by the blade, for example segmental, as within the scope of the invention.

The operation of the device is thought to be clear from the above description, and what is claimed as new and desired to be secured by Letters Patent of the United States is:

1. The combination of an outside rear-view mirror and a wiper mechanism, comprising a frame, a mirror mounted in said frame, an articulated support arm connected at one end to said frame and adapted for connection at the other end to a vehicle for adjustable positioning of the mirror relative thereto, a motor mounted on the front side of said mirror frame and including an oscillatable output shaft extending through said frame to a position rearwardly of said mirror, means affording connection of said motor with power means on the vehicle for operation thereby, a wiper arm on said shaft disposed in overlying parallel relation to the plane of said mirror, a pivot mounting adjacent the free end of said wiper arm, a wiper blade detachably and pivotally secured to said pivot mounting in off-center relation thereto for oscillating movement with said wiper arm, the shorter portion of said blade being most remote from said motor shaft, stop means fixed to said mirror frame at opposite sides thereof in position for engagement by said wiper blade as the latter is oscillated by movement of said wiper arm, said stop means on each side of the mirror being disposed so that contact therewith by the free end of said shorter blade portion causes said wiper blade to move about said pivot mounting to a position substantially normal to the direction of travel of said wiper arm to thereby align said blade with the side of said frame to complete the wiping of said mirror and position said blade for reverse movement.

2. The combination of an outside rear-view mirror and wiper mechanism, comprising a frame, a mirror mounted in said frame, a support arm connected at one end to said frame and adapted for connection at the other end to a vehicle for adjustable positioning of the mirror relative thereto, a motor mounted on the front side of said mirror frame and including an oscillatable output shaft extending through said frame to a position rearwardly of said mirror, means affording connection of said motor with power means on the vehicle for operation thereby, a wiper arm on said shaft disposed in overlying parallel relation to the plane of said mirror, a pivot mounting adjacent the free end of said wiper arm, a wiper blade detachably and pivotally secured to said pivot mounting in off-center relation thereto for oscillating movement with said wiper arm, said wiper blade being disposed with the longer portion thereof above said pivot mounting so as to cause the upper portion of the blade to trail the lower portion as the wiper blade is moved across the mirror, a pair of stop means fixed to said mirror frame at each of the opposite sides thereof in position for engagement by said wiper blade as the latter is oscillated by movement of said wiper arm, each of said pair of stop means being disposed so that the lower end portion of said wiper blade first engages one of said stop means and continued movement of said wiper blade causes the latter to move about said pivot mounting to a position of engagement with the other of said pair of stop means to thereby complete the wiping of the mirror surface and position said wiper blade for wiping movement in the reverse direction.

References Cited in the file of this patent

UNITED STATES PATENTS

| | | |
|---|---|---|
| 1,865,158 | Acierno | June 28, 1932 |
| 1,944,260 | Meyers | Jan. 23, 1934 |
| 2,121,815 | Morrison | June 28, 1938 |
| 2,376,012 | Saachini | May 15, 1945 |
| 2,397,748 | Meindering | Apr. 2, 1946 |
| 2,604,652 | Poindexter | July 29, 1952 |
| 2,622,261 | Smith | Dec. 23, 1952 |
| 2,722,707 | Musselman | Nov. 8, 1955 |